United States Patent
Subedi et al.

(10) Patent No.: US 10,668,414 B2
(45) Date of Patent: Jun. 2, 2020

(54) INTAKE BYPASS FLOW MANAGEMENT SYSTEMS AND METHODS

(71) Applicant: Cummins Filtration IP, Inc., Columbus, IN (US)

(72) Inventors: Yashpal Subedi, Madison, WI (US); Dane P. Miller, Monona, WI (US); Barry M. Verdegan, Stoughton, WI (US); Shantanu Nadgir, Columbus, IN (US); W. Beale Delano, Columbus, IN (US); Andry Lesmana, Columbus, IN (US); Jitesh Panicker, Columbus, IN (US); Jeffrey L. Oakes, Columbus, IN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 154 days.

(21) Appl. No.: 15/327,834

(22) PCT Filed: Jul. 21, 2015

(86) PCT No.: PCT/US2015/041395
§ 371 (c)(1),
(2) Date: Jan. 20, 2017

(87) PCT Pub. No.: WO2016/014580
PCT Pub. Date: Jan. 28, 2016

(65) Prior Publication Data
US 2017/0203241 A1    Jul. 20, 2017

Related U.S. Application Data

(60) Provisional application No. 62/027,984, filed on Jul. 23, 2014.

(51) Int. Cl.
*B01D 53/22* (2006.01)
*B01D 35/147* (2006.01)
(Continued)

(52) U.S. Cl.
CPC .......... *B01D 35/147* (2013.01); *B01D 29/56* (2013.01); *B01D 29/605* (2013.01);
(Continued)

(58) Field of Classification Search
CPC .. B01D 35/005; B01D 46/46; B01D 2279/60; B01D 29/605; B01D 29/56;
(Continued)

(56) References Cited

U.S. PATENT DOCUMENTS 2,799,848 A * 7/1957 Glantz ...................... G05D 9/12
137/409
3,411,272 A   11/1968 Carmon
(Continued)

FOREIGN PATENT DOCUMENTS

CN       101468268 A      7/2009

OTHER PUBLICATIONS

Harris "HowStuffWorks_How Superchargers Work" Mar. 29, 2013, 11 pages <https://web.archive.org/web/20130329080120/https://auto.howstuffworks.com/supercharger.htm/printable (Year: 2013).*
(Continued)

*Primary Examiner* — Anthony R Shumate
(74) *Attorney, Agent, or Firm* — Foley & Lardner LLP

(57) ABSTRACT

Filtration systems having a normal filtration mode and an enhanced filtration mode are described. In some arrangements, the filtration system is an air filtration system having a primary air filter element, a pre-cleaner, and a pre-cleaner bypass valve. Based on feedback from an intake air quality sensor the bypass valve is either opened or closed to selectively route intake air through the pre-cleaner during sensed dirty air operating conditions (e.g., heavy dust or moisture concentrations). In other arrangements, the filtration system is a liquid filtration system (e.g., a fuel or oil a secondary filter. The filtration system selectively routes the
(Continued)

liquid being filtered through the main filter, the secondary filter, or a combination thereof depending on a detected event or sensed characteristic of the liquid.

22 Claims, 8 Drawing Sheets

(51) Int. Cl.
| | |
|---|---|
| *B01D 46/00* | (2006.01) |
| *B01D 46/44* | (2006.01) |
| *B01D 46/46* | (2006.01) |
| *B01D 29/56* | (2006.01) |
| *B01D 29/60* | (2006.01) |
| *B01D 35/00* | (2006.01) |
| *B01D 35/26* | (2006.01) |
| *F02M 35/02* | (2006.01) |
| *F02M 35/024* | (2006.01) |
| *F02M 35/08* | (2006.01) |

(52) U.S. Cl.
CPC .......... *B01D 35/005* (2013.01); *B01D 35/26* (2013.01); *B01D 46/0087* (2013.01); *B01D 46/442* (2013.01); *B01D 46/46* (2013.01); *F02M 35/024* (2013.01); *F02M 35/0212* (2013.01); *F02M 35/082* (2013.01); *B01D 2279/60* (2013.01)

(58) Field of Classification Search
CPC .. B01D 46/0087; B01D 46/442; B01D 35/26; F02M 35/082; F02M 35/024; F02M 35/0212
See application file for complete search history.

(56) References Cited

U.S. PATENT DOCUMENTS

| | | | |
|---|---|---|---|
| 4,723,443 A | 2/1988 | Usui et al. | |
| 4,748,336 A | 5/1988 | Fujie et al. | |
| 5,155,999 A | 10/1992 | Hashimoto et al. | |
| 6,394,062 B2 | 5/2002 | Daly et al. | |
| 6,395,048 B1 | 5/2002 | Yoder et al. | |
| 6,564,768 B2 | 5/2003 | Bauer et al. | |
| 6,810,667 B2 | 11/2004 | Jung et al. | |
| 6,971,358 B2 | 12/2005 | Shimatsu | |
| 7,206,264 B1* | 4/2007 | Hermanns | G11B 7/0946 |
| | | | 369/44.25 |
| 7,286,678 B1* | 10/2007 | Bachler | H04R 25/305 |
| | | | 381/312 |
| 7,472,679 B2 | 1/2009 | Yamashita et al. | |
| 7,552,711 B2 | 6/2009 | Kaneko | |
| 7,802,433 B2 | 9/2010 | Higgins | |
| 9,234,795 B2* | 1/2016 | Sano | G02B 26/001 |
| 9,273,649 B2 | 3/2016 | Gomez et al. | |
| 2003/0196942 A1* | 10/2003 | Jones | E04H 4/1209 |
| | | | 210/167.12 |
| 2007/0277592 A1 | 12/2007 | Johansson et al. | |
| 2009/0013953 A1* | 1/2009 | Fujita | B01D 46/0023 |
| | | | 123/184.21 |
| 2009/0031986 A1 | 2/2009 | Kaneko | |
| 2009/0101121 A1 | 4/2009 | Okamura | |
| 2009/0114186 A1 | 5/2009 | Onuma et al. | |
| 2009/0136388 A1 | 5/2009 | Chan et al. | |
| 2009/0178633 A1 | 7/2009 | Pattakos et al. | |
| 2010/0031737 A1 | 2/2010 | Saito et al. | |
| 2010/0083928 A1 | 4/2010 | Saito et al. | |
| 2010/0139617 A1 | 6/2010 | Akiyama et al. | |
| 2011/0030560 A1 | 2/2011 | Bohlen et al. | |
| 2011/0083419 A1 | 4/2011 | Upadhyay et al. | |
| 2012/0070336 A1 | 3/2012 | Chan et al. | |
| 2012/0210977 A1 | 8/2012 | Kuo et al. | |
| 2012/0210979 A1 | 8/2012 | Okumura et al. | |
| 2013/0036806 A1 | 2/2013 | Kohno | |
| 2013/0174643 A1 | 7/2013 | Wang et al. | |
| 2014/0123621 A1 | 5/2014 | Driessens et al. | |
| 2014/0216685 A1 | 8/2014 | Bicknell | |
| 2016/0139104 A1* | 5/2016 | Massey | G01N 27/12 |
| | | | 436/60 |
| 2017/0197165 A1* | 7/2017 | Schwartz | B01D 46/002 |
| 2018/0098878 A1* | 4/2018 | Kostic | A61F 7/0053 |

OTHER PUBLICATIONS

First Office Action issued for Chinese Patent Application No. 2015800386264, dated Jun. 5, 2018, 6 pages.

Dust Sensor Module, P/N: DSM 501, Specification, Samyoung S&C Co., Ltd. 11 pages, www.samyoungsnc.com, www.samyoungsnc.com/products/3-1%20Specification%20DSM501.pdf, no date given, but at least as early as Jul. 21, 2014.

GP2Y101AY0F, Compact Optical the Sensor, Device Specification Sheet No. E4-A01501EN, Sharp Corporation, Dec. 1, 2006, 9 pages.

International Search Report and Written Opinion issued for PCT Application No. PCT/US2015/041395, dated Dec. 17, 2015, 10 Pages.

* cited by examiner

INTAKE BYPASS FLOW MANAGEMENT SYSTEMS AND METHODS

CROSS-REFERENCE TO RELATED APPLICATIONS

This application is a National Stage of PCT Application No. PCT/US2015/041395, filed Jul. 21, 2015, which claims priority to U.S. Provisional Patent Application No. 62/027,984, entitled "AIR INTAKE BYPASS FLOW MANAGEMENT SYSTEMS AND METHODS," filed on Jul. 23, 2014. The contents of both applications are herein incorporated by reference in their entirety.

TECHNICAL FIELD

The present disclosure relates generally to filtration systems.

BACKGROUND

Internal combustion engines typically include various filtration systems, such as air filtration systems, fuel filtration systems, oil filtration systems, and the like. The filtration systems generally remove contaminants, such as dust and water, from fluids used by the internal combustion engine.

The air filtration system is part of an air intake system. The air filtration system filters intake air prior to routing the intake air to the engine. The air filtration systems remove dust, moisture, and other particulate from the intake air. The air filtration systems typically include a filter media (e.g., a paper-based filter media, a foam-based filter media, a cotton-based filter media, a pleated filter media, etc.) that processes the air. Some air filtration systems include a pre-cleaner positioned upstream of the filter media. A pre-cleaner removes at least a portion of the dust, moisture, and other particulate matter from the intake air prior to the intake air being processed by the filter media. Accordingly, the pre-cleaner extends the life of the filter media. The pre-cleaner may be an ejective pre-cleaner, a pre-filter pre-cleaner, a cyclonic pre-cleaner, or the like. The specific type of pre-cleaner may be selected based on the worst dust loading conditions that an internal combustion engine is expected to see during operation.

A pre-cleaner, however, also causes parasitic air pressure losses in the air intake system due to the increased restriction caused by the pre-cleaner. The parasitic losses are present even when the pre-cleaner is unnecessary (e.g., when the internal combustion engine is operating in a clean air environment). The parasitic losses may cause higher pumping loss, thereby reducing the fuel economy for the internal combustion engine (e.g., reduced miles per gallon in a vehicle application, fewer operating hours per tank in a generator or construction application, etc.). The reduced fuel economy increases operating costs (i.e., increases fuel costs).

Other filtration systems, such as fuel, oil, and hydraulic fluid filtration systems, filter liquids that are used by the internal combustion engine or used to drive equipment. Generally, these filtration systems draw fluid to be filtered from a tank (e.g., a fuel tank, an oil tank, a hydraulic fluid tank, etc.). Certain operating conditions can cause the fluid to have increased contamination levels. Specifically, contaminant particles may be re-entrained from the surfaces of piping, filter media, tank bottoms, and the like during certain transient conditions, such as fluid flow surges, vibrations, and the like. This is particularly problematic during tank fill up and engine or hydraulic system start up events. During tank fill ups, elevated contamination levels may be found in the new (but frequently not clean) liquid introduced into the tank. Contaminant levels are further increased by the resuspension of contaminant from tank bottoms and walls by the filling operation itself. When an engine or hydraulic system is started, the liquid flow rate to the downstream components, including the filtration system, goes from zero to operating flow rates in a matter of seconds or even less. As such, extremely high contamination levels are temporarily observed as the fluid accelerates from a generally stationary position to a moving stream. During these periods, wear induced damage to downstream components is especially high. Orders of magnitude increases in fuel contamination levels have been observed at engine start up and during rapid changes in flow rate. Such increases in the liquid born contamination reduce component life, reduce engine reliability, and reduce overall system robustness. These increases in contamination levels also have the potential to shorten the useful life of the filtration system. Additionally, the introduction of the multiple filter elements, much like the above-described pre-cleaners for air filtration systems, introduces greater restriction to the filtration systems thereby causing parasitic liquid pressure losses in the filtration systems.

SUMMARY

One embodiment relates to an air filtration system. The air filtration system includes a primary filter element and a pre-cleaner positioned upstream of the primary filter element in an air flow direction. The air filtration system further includes a bypass valve actuatable between a first position and a second position. When the bypass valve is in the first position, intake air to be filtered bypasses the pre-cleaner and flows to the primary filter element. When the bypass valve is in the second position, intake air to be filtered is forced through the pre-cleaner prior to flowing to the primary filter element. The air filtration system further includes an air quality characteristic sensor and a controller. The controller is configured to receive a feedback signal from the air quality characteristic sensor indicative of a sensed air quality characteristic of the intake air and to actuate the bypass valve between the first position and the second position via an actuation mechanism.

Another embodiment relates to a filtration system. The filtration system includes a fluid source providing a fluid to be filtered, a main filter, a secondary filter, and a detector that detects a fill-up condition, a start-up condition, a change in fluid contaminant concentration, or a fluid flow rate change of a system using the fluid. The filtration system further includes a valve that can be opened or closed to switch the filtration system between a normal filtration mode and an enhanced filtration mode. The enhanced filtration mode corresponding to an operating mode in which an increased amount of the fluid to be filtered through the secondary filter element than when in the normal filtration mode. The filtration system includes an electronic control unit having a memory and a processor. The electronic control unit is configured to receive a feedback signal from the detector indicative of a fill-up event, a start-up event, a change in fluid contaminant concentration, or a fluid flow rate change, and to switch between the normal filtration mode and the enhanced filtration mode in response to the fill-up event, the start-up event, the change in fluid contaminant concentration, or the fluid flow rate change.

A further embodiment relates to a method of switching a filtration system between a normal filtration mode and an enhanced filtration mode based on a detected event. The method includes receiving, by an electronic control unit of the filtration system, a feedback signal from a sensor of the filtration system. The method further includes determining, by the electronic control unit, that the feedback signal corresponds to a fill-up event or a start-up event. The method includes activating, by the electronic control unit, the enhanced filtration mode of the filtration system. The enhanced filtration mode corresponds to an operating mode of the filtration system in which an increased amount of the fluid to be filtered passes through an filtration component than when in the normal filtration mode.

Another embodiment relates to a filtration system. The filtration system includes a fluid source providing a fluid to be filtered, a main filter, and a secondary filter. The filtration system further includes a fluid quality characteristic sensor that senses a fluid quality characteristic of the fluid. The filtration system includes a valve that can be opened or closed so as to switch the filtration system between a normal filtration mode and an enhanced filtration mode. The enhanced filtration mode corresponds to an operating mode in which an increased amount of the fluid to be filtered is filtered through the secondary filter element than when in the normal filtration mode. The filtration system includes an electronic control unit having a memory and a processor. The electronic control unit is configured to receive a feedback signal from the detector indicative of a change in the fluid quality characteristic of the fluid, and to switch between the normal filtration mode and the enhanced filtration mode in response to the change in the fluid quality characteristic.

A further embodiment relates to a filtration system. The filtration system includes a fluid source providing a fluid to be filtered, a main filter, and a secondary filter. The filtration system includes a detector that detects a fill-up condition, a start-up condition, a change in fluid contaminant concentration, or a fluid flow rate change of a system using the fluid. The filtration system further includes a pump that routes the fluid to the secondary filter such that the pump can be activated and deactivated to switch the filtration system between a normal filtration mode and an enhanced filtration mode. The enhanced filtration mode corresponds to an operating mode in which an increased amount of the fluid to be filtered is filtered through the secondary filter than when in the normal filtration mode. The filtration system includes an electronic control unit having a memory and a processor. The electronic control unit is configured to receive a feedback signal from the detector indicative of a fill-up event, a start-up event, a change in fluid contaminant concentration, or a fluid flow rate change, and to switch between the normal filtration mode and the enhanced filtration mode in response to the fill-up event, the start-up event, the change in fluid contaminant concentration, or the fluid flow rate change by activating the pump.

These and other features, together with the organization and manner of operation thereof, will become apparent from the following detailed description when taken in conjunction with the accompanying drawings.

DETAILED DESCRIPTION

Figure 1:
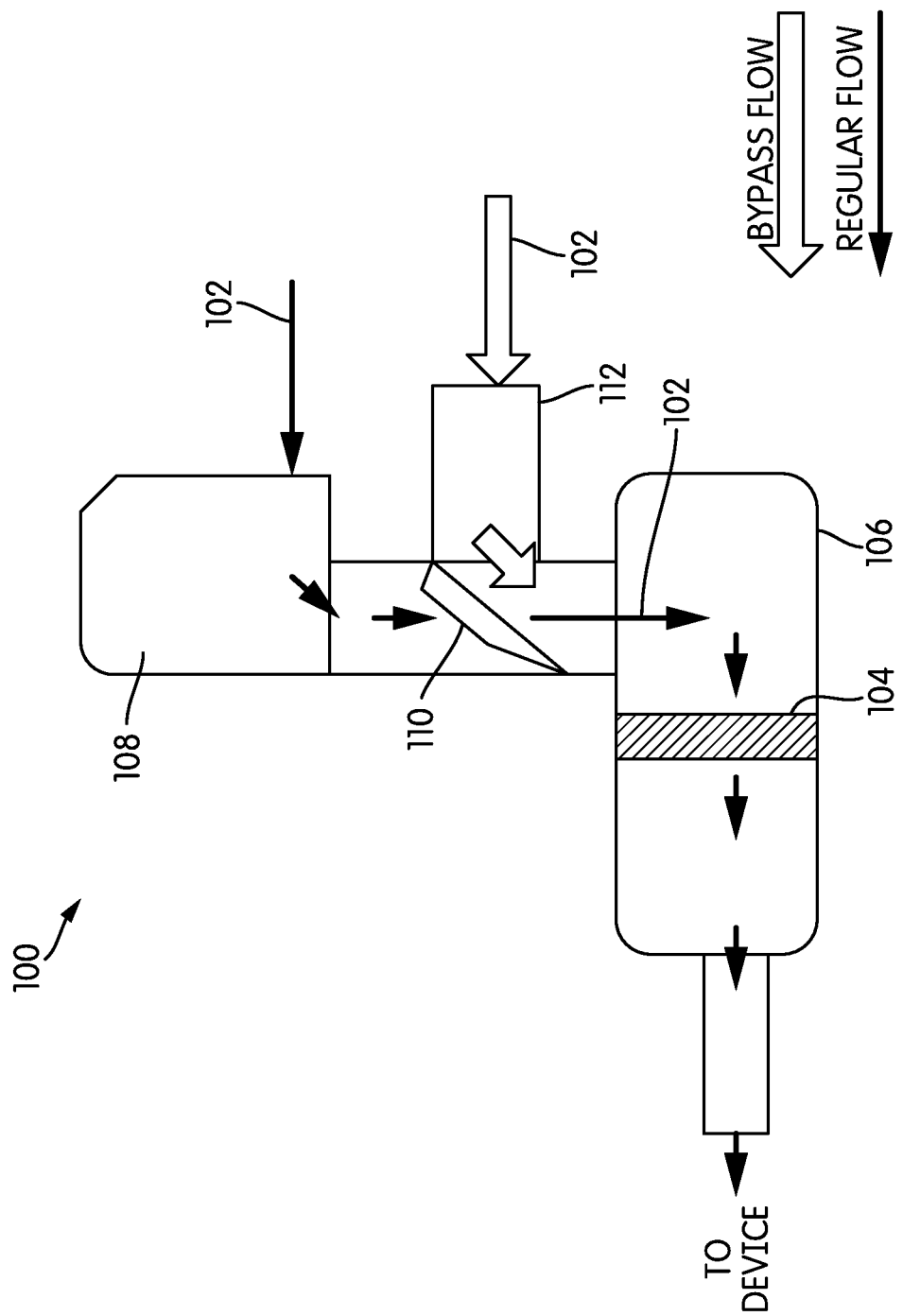
FIG. 1 is a schematic view of an air filtration system according to an exemplary embodiment.

Referring to generally to the figures, filtration systems having both a normal filtration mode and an enhanced filtration mode are shown. The normal filtration mode corresponds to an operating condition in which fluid being filtered is routed through a primary filtration system and bypasses a secondary filtration system. The enhanced filtration mode corresponds to an operating condition in which fluid to be filtered is routed through both the primary filter and the secondary filter. The enhanced filtration mode is used when the fluid to be filtered contains a higher than normal level (i.e., an elevated level) of contaminants, such as water, dust, and the like or when there is a fluid flow rate increase (e.g., when an operator increases the throttle of an internal combustion engine). The normal filtration mode is used when the fluid to be filtered contains a normal level or lower than normal level of contaminants or when fluid flow conditions are at a normal or steady-state rate.

FIGS. 1-4 generally relate to an air filtration system. The air filtration system filters intake air prior to routing the intake air to an internal combustion engine. The air filtration system includes a primary filter element comprised of a filter media (e.g., a paper-based filter media, a foam-based filter media, a cotton-based filter media, a pleated filter media, etc.). The air filtration system also includes a pre-cleaner positioned upstream of the primary filter element. The air filtration system is fitted with a control system that includes a sensor (e.g., a dust particle sensor, a moisture sensor, a turbidity sensor, etc.) and a flow bypass valve mechanism that, when opened, allows intake air to bypass the pre-cleaner and flow directly to the primary filter element. Based on feedback from the sensor (e.g., a feedback signal indicative of an air quality measurement, an amount of dust in the air, an amount of moisture in the air, etc.) the bypass valve is either opened or closed. During sensed clean air operating conditions (e.g., low dust and moisture concentrations), the bypass valve is opened to allow intake air to bypass the pre-cleaner, thereby providing a low resistance air flow and better fuel economy. During sensed dirty air operating conditions (e.g., heavy dust or moisture concentrations), the bypass valve is closed thereby routing intake air into the pre-cleaner to increase the service life of the primary filter element. The overall air filtration system provides for an overall (i.e., average) better fuel economy rating than those systems without the bypass valve.

FIGS. 5-9 generally relate to a liquid filtration system. The liquid filtration system may be a fuel filtration system, an oil filtration system, or a hydraulic fluid filtration system. The liquid filtration systems draw fluid to be filtered from a storage tank. The filtration system detects tank fill-ups or engine or hydraulic system start-up events through sensors (e.g., fluid flow sensors, fluid quality characteristic sensors, etc.) or detectors (e.g., an ignition switch) that produce an electrical output or signal. A controller, such as the electronic control module (ECU) of the engine or hydraulic system, that monitors and receives the output from the sensor or detector. When the controller receives a signal indicating a fill-up or start-up event, the controller can put the filtration system into an enhanced filtration operating mode for a period of time. In some arrangements, the controller puts the filtration system into the enhanced mode of operation when the flow of fluid through the filtration system is elevated above a normal fluid flow rate or is changing. While in the enhanced filtration operating mode, the filtration system routes fluid through additional filtering components than the normal filtration operating mode to remove potential elevated contamination levels from the fluid. The enhanced mode of operation continues for a time interval determined by the controller. Alternatively, the enhanced mode of operation continues while a fluid flow rate is changing or elevated above a normal fluid flow rate. After the time interval expires or the fluid flow rate through the filtration system returns to a normal or stead-state flow rate, the filtration system is returned to its normal mode of operation.

Referring to FIG. 1, a schematic view of an air filtration system 100 is shown according to an exemplary embodiment. The air filtration system 100 filters intake air 102 and routes the intake air 102 to a device, such as an internal combustion engine (e.g., of a vehicle, a generator, construction equipment, etc.). The air filtration system 100 includes a primary filter element 104 housed within a filter housing 106. The primary filter element 104 may be a paper-based filter media, a foam-based filter media, a cotton-based filter media, a pleated filter media, a panel filter element, a cylindrical filter element, or another type of filter element. The primary filter element 104 removes at least a portion of the dust, moisture, and other particulate matter from the intake air 102. The air filtration system 100 also includes a pre-cleaner 108 positioned upstream of the primary filter element 104 in an air flow direction. The pre-cleaner 108 may be an ejective pre-cleaner, a pre-filter pre-cleaner, a cyclonic pre-cleaner, or the like. When intake air is routed through the pre-cleaner 108, the pre-cleaner 108 removes at least a portion of the dust, moisture, and other particulate matter from the intake air 102 prior to the intake air being processed by the primary filter element 104. When the intake air 102 is routed through the pre-cleaner 108, the restriction of the air filtration system 100 is higher than if the pre-cleaner 108 was not present.

Figure 2:
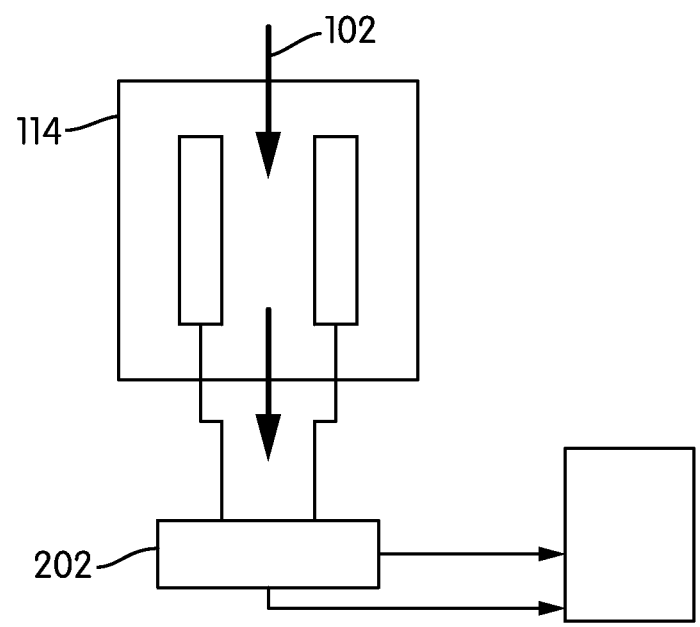
FIG. 2 is a close-up schematic view of each sensor of the air filtration system of FIG. 1.

The air filtration system 100 includes a bypass control system. The bypass control system includes a bypass flow valve 110, a bypass intake 112, a sensor 114, and a controller 202 (as shown in FIG. 2). Although shown as including two sensors 114, the air filtration system 100 may be configured to work with a single sensor 114 (e.g., a single sensor 114 positioned upstream of a bypass valve, which is also positioned upstream of both the pre-cleaner 110 and the bypass intake 112). The sensor 114 measures an air quality characteristic of intake air 102. The air quality characteristic may relate to an amount of dust in the air, an amount of moisture in the air, or a combination thereof. The sensors 114 may be any of a dust particle sensor, a moisture sensor, a turbidity sensor, a capacitance sensor, or the like. The sensors 114 provide feedback signals indicative of the sensed air quality characteristic to a controller 202 of the bypass control system. In some arrangements, the controller 202 is an engine control module ("ECM") of an internal combustion engine.

The controller 202 opens and closes the bypass flow valve 110 based on the measured air quality characteristic (e.g., based on the feedback signal received from the sensors 114). When the sensor feedback indicates that the intake air 102 is clean (e.g., contains a low level of dust and moisture), the controller 202 actuates the bypass flow valve 110 to a first, open position creating a first air flow path for the air filtration system 100. The first air flow allows the intake air 102 to bypass the pre-cleaner 108 and flow to the primary filter element 104. When the sensor feedback indicates that the intake air 102 is dirty (e.g., contains greater than a threshold level of dust or moisture), the controller 202 actuates the bypass flow valve 110 to a second, closed position creating a second air flow path for the air filtration system 100. The second air flow path forces the intake air 102 to pass through the pre-cleaner 108 prior to flowing to the primary filter element 104. The second air flow path has a higher air restriction than the first air flow path. The second air flow path increases the life of the primary filter element 104 during dirty air conditions. It should be understood that the flow paths of the air filtration system 100 can be configured in an opposite manner (e.g., such that the pre-cleaner 108 is bypassed by the intake air 102 when the bypass flow valve 110 is closed).

Referring to FIG. 2, a close-up schematic view of each sensor 114 is shown according to an exemplary embodiment. As the intake air 102 passes through or by the each sensor 114, each sensor 114 senses the air quality characteristic. In some arrangements, the air quality characteristic is sensed by counting and sizing particles passing by or through each sensor 114. In other arrangements, the air quality characteristic is sensed by measuring an opacity or transparency of the intake air 102 by passing a light or laser through the intake air 102. For example, the intake air 102 may pass between two parts of each sensor 114: a light emitting part and a light sensing part. In the exemplary arrangement, the light emitting part emits light into the light sensing part. The opacity of the intake air 102 is determined based on how much or how little light is sensed by the light sensing part. The opacity of the intake air 102 corresponds to the amount of dust and moisture in the intake air 102. In an alternative arrangement, the air quality characteristic is sensed by measuring a moisture content of the intake air 102. In still further arrangements, the air quality characteristic is sensed by measuring a capacitance or inductance of the intake air 102.

Figure 3:
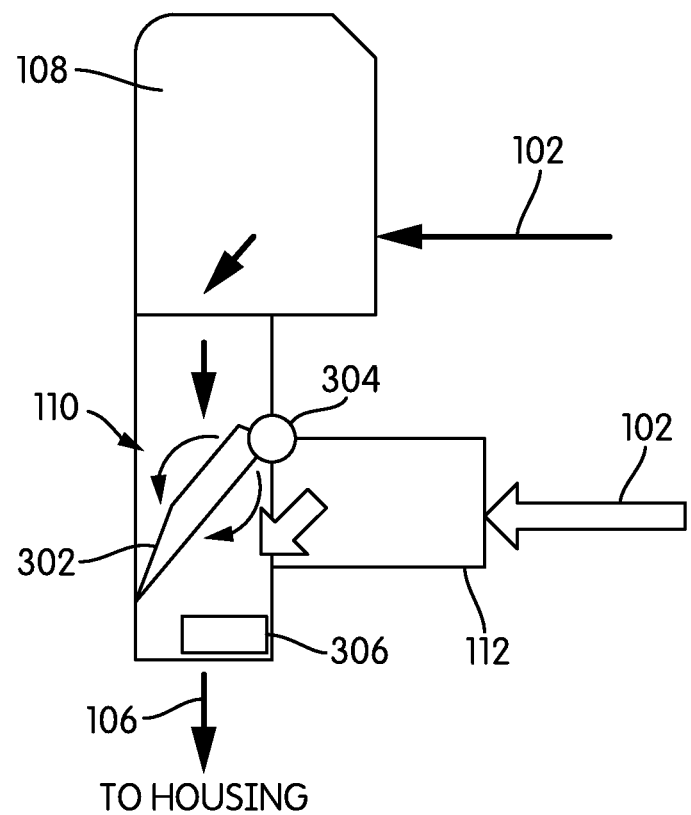
FIG. 3 is a close-up schematic view of the bypass valve of the air filtration system of FIG. 1.

FIG. 3 shows a close-up schematic view of the bypass valve 110 of FIG. 1. The bypass valve 110 includes a flap 302 and a hinge 304. The hinge 304 is positioned near the bypass intake 112. The hinge 304 permits the flap 302 to pivot about the hinge 304 between a first position and a second position. In the first position, the flap 302 is pivoted away from the bypass intake 112 placing the bypass valve 110 in the open position thereby permitting the intake air 102 to travel along the first air flow path as discussed above. In the second position, the flap 302 is pivoted towards the bypass intake 112 placing the bypass valve 110 in the closed position thereby forcing the intake air 102 to travel along the second air flow path as discussed above. A valve actuation mechanism 306 moves the flap 302 between the first position and the second position. In some arrangements, the valve actuation mechanism 302 can maintain the flap 302 in any position between the first position and the second position thereby allowing at least a portion of the intake air 102 to flow through the pre-cleaner 108 and a portion of the intake air 102 to bypass the pre-cleaner 108. The valve actuation mechanism 302 is controlled by the controller 202 based on the feedback signals from the sensors 114.

Figure 4:
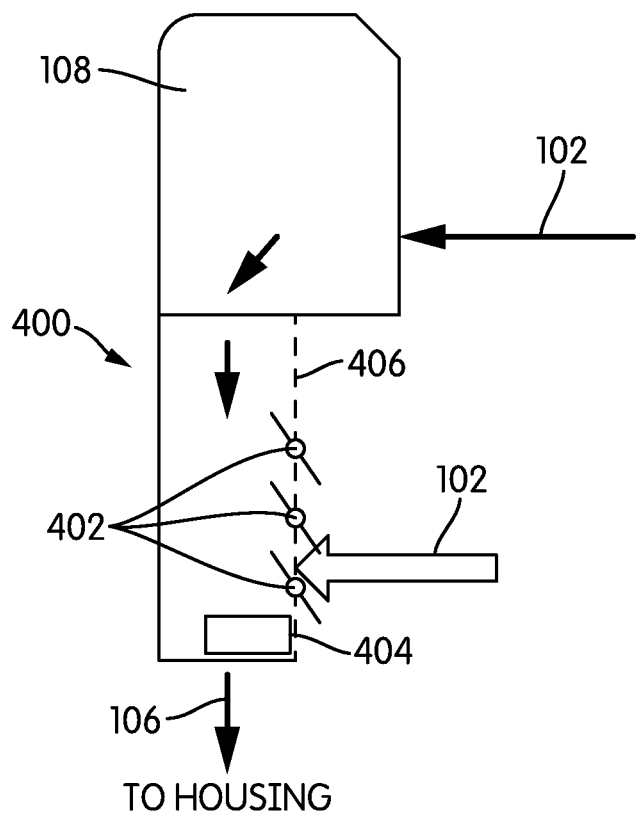
FIG. 4 is a close-up schematic view of a bypass valve according to an exemplary embodiment.

FIG. 4 shows a close-up schematic view of a bypass valve 400 according to an exemplary embodiment. The bypass valve 400 is similar to and an alternative to the bypass valve 110. For ease of explanation, similar reference numbers and terms will be used to describe the alternative bypass valve 400. Unlike the bypass valve 110 opening and closing a flap 302, bypass valve 400 functions by opening and closing a plurality of louvers 402. Each of the louvers 402 includes a slat and a central hinge. The louvers 402 move together between an opened position (when each slat is substantially perpendicular to axis 406) and a closed position (when each slat is substantially parallel to axis 406). When the louvers 402 are in the opened position, intake air 102 bypasses the pre-cleaner 108 (i.e., travels along the first air flow path as discussed above with respect to FIGS. 1-3). When the louvers 402 are in the closed position, the intake air 102 is forced to pass through the pre-cleaner 108 (i.e., travels along the second air flow path as discussed above with respect to FIGS. 1-3). A valve actuation mechanism 404 moves the louvers 402 between the opened position and the closed position. The valve actuation mechanism 404 is controlled by the controller 202 based on the feedback signals from the sensors 114.

The above described pre-cleaner bypass systems and methods allow for adaptable air filtration systems having additional restriction in pre-cleaners for better dust separation when actually separating dust, without sacrificing restriction when handling clean air flow through the use of a bypass valves. The systems and methods manage unnecessary loss of pressure while flowing through pre-cleaner or moisture removal system is avoided.

As described below in further detail, similar concepts may be applied to other types of filtration systems, such as fuel, oil, and hydraulic fluid filtration systems. In certain filtration systems that filter fluid received from a tank (e.g., a fuel tank, an oil tank, a hydraulic fluid tank, etc.), certain operating conditions can cause the fluid to have increased contamination levels. Specifically, contaminant particles may be re-entrained from the surfaces of piping, filter media, tank bottoms, and the like during fluid flow surges that can be caused by tank fill ups and engine or hydraulic system start up events.

Figure 5:
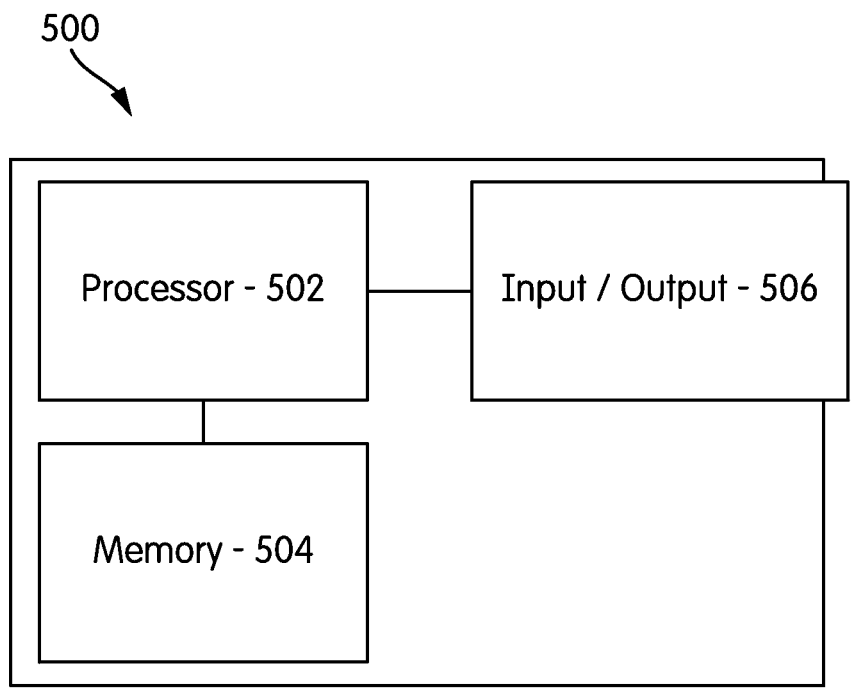
FIG. 5 is a block diagram of an electronic control unit according to an example embodiment.

Referring to FIG. 5, a block diagram of an ECU 500 is shown according to an example embodiment. The ECU 500 controls the operation of a filtration system. Specifically, the ECU 500 toggles the filtration system between a normal filtration mode and an enhanced filtration mode. In the enhanced filtration operating mode, fluid to be filtered passes through additional filtration components than the normal filtration mode. The ECU 500 generally includes a processor 502, memory 504, and an input/output (I/O) 506. The memory 504 includes programming modules that, when executed by the processor 502, control the operation of the ECU 500, and thus control the operation of the filtration system.

Through the I/O 506, the ECU 500 monitors feedback signals to determine when a fill-up and/or start-up event is detected. Fill-up and/or start-up events can be detected by the ECU 500 by sensing whether a fluid tank's fill cap is in place or has been removed, by sensing changes in a liquid level in the fluid tank, by sensing whether the internal combustion engine or hydraulic system fed by the filtration system has been turned on (e.g., by determining a key on situation), by sensing whether liquid flow has been initiated through the filtration system, and/or by measuring changes in the flow rate through the filtration system. Accordingly, the ECU 500 can communicate with various sensors (e.g., fluid tank cap sensors, tank fluid sensors, flow rate sensors, engine control modules, hydraulic system control modules, engine ignition sensors, fluid quality characteristic sensors, etc.). Example fluid sensing techniques and systems are described in U.S. Publication No. 2010/0327884, U.S. Publication No. 2011/0140877, and U.S. Pat. No. 4,173,893, each of which are incorporated herein by reference in their entireties and for all purposes. In some arrangements, it is desirable to convert an analog output of any of the above-described sensors to a digital output to facilitate sensor output to the ECU 500. In such arrangements, the digital nature of the sensor feedback signals allows the ECU 500 to be programmed to interpret the feedback signals to distinguish insignificant changes in liquid level or flow rate from noteworthy events, such as filling operations or start-ups (e.g., as described in further detail below).

Through the I/O 506, the ECU 500 can actuate valves and diverters of the filtration system to switch between the normal filtration mode and the enhanced filtration mode. The ECU 500 switches between the operating modes based on the feedback received from the above-described sensors. Additionally, through the I/O 506, the ECU 500 can communicate with an operator or technician through a user indicator (e.g., a display, an LED, a dashboard indicator, etc.).

In some arrangements, the ECU 500 can distinguish between fill-up events, fluid flow rate changes, and start-up events, as the highest contaminant levels in the fluids stored in the tanks are expected to occur during filling operations due to re-suspension of settled contaminant (such as from the tank bottom) and the introduction of new contaminant from the new fluid. Accordingly, the ECU 500 can put the filtration system into the enhanced filtration mode for a longer period of time for a fill-up event and a shorter period of time for a system or engine start-up event. To distinguish between the two, the ECU 500 may rely on a combination of sensing technologies (e.g., fluid tank cap sensors, fluid characteristic sensors, and fluid flow-rate sensors). Alternatively, the ECU 500 can receive input from a location sensor (e.g., a GPS transponder) to compare a location of the vehicle or equipment with locations of known service stations or filling terminals. If either the engine is turned on or the flow rate increases from zero to a working flow rate while near (e.g., within 20 meters) the location of a service station, the ECU 500 can interpret the event as a filling event. If the vehicle is not near a service station, the ECU 500 interprets the event as a simple start-up event.

The operation of the ECU 500 in specific systems is described in further detail below with respect to FIGS. 6 through 10.

Figure 6:
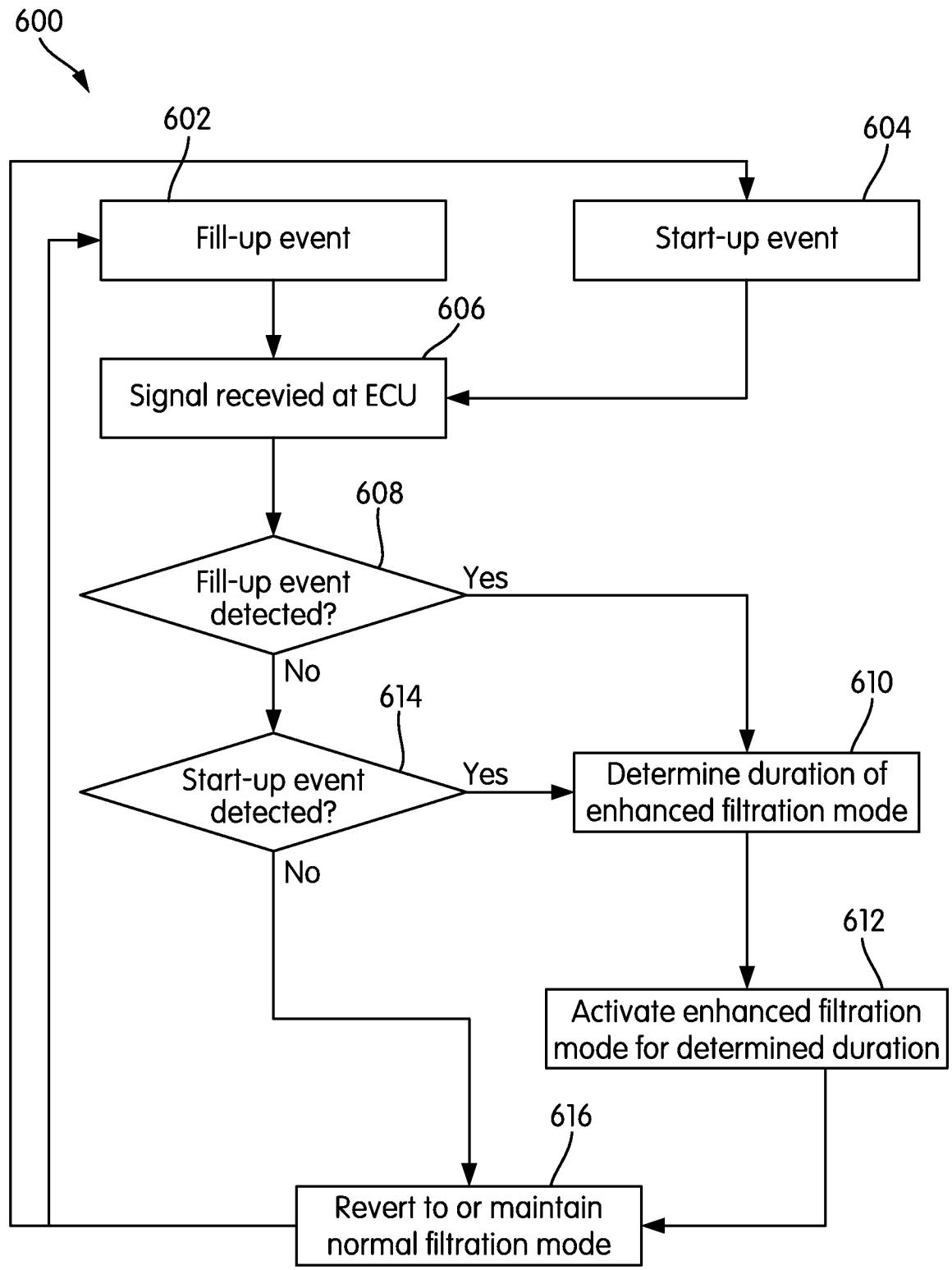
FIG. 6 is a flow diagram of a method of switching a filtration system between a normal filtration mode and an enhanced filtration mode based on a detected event according to an example embodiment.

Referring to FIG. 6, a flow diagram of a method 600 of switching a filtration system between a normal filtration mode and an enhanced filtration mode based on a detected event is described according to an example embodiment. Method 600 is performed by a filtration system controller, such as ECU 500. In method 600, the filtration system is normally operated in the normal filtration mode. The filtration system can be temporarily switched into an enhanced filtration mode based on detected events (e.g., a fill-up event or a start-up event).

The method 600 begins when a fill-up event occurs at 602 or a start-up event occurs at 604. A fill-up event relates to a situation in which a tank storing liquid to be filtered by the filtration system is filled with additional liquid. A start-up event occurs when an internal combustion engine or hydraulic system using the liquid filtered by the filtration system starts-up. The fill-up event or start-up event may be determined by the above-described sensors or detectors. For example, a fill-up event can be determined by sensing whether the liquid tank's fill cap is in place or has been removed or by sensing changes in the liquid level in the tank. A start-up event can be determined by sensing or detecting whether the engine or hydraulic system has been turned on or by sensing whether liquid flow through the filtration system has been initiated or is experiencing a change in the flow rate.

Feedback signals from the sensors are received at the ECU 500 at 606. Based on the feedback signals from the sensors, the ECU 500 can determine the existence of the fill-up event (that occurs at 602) or the start-up event (that occurs at 604). The ECU 500 determines whether a fill-up event occurred based on the sensor feedback signals at 608. If a signal indicating a fill-up event is indicated, the ECU 500 determines a duration of enhanced filtration mode at 610. The duration of enhanced filtration mode represents the time period for which the filtration system is in the enhanced filtration mode before reverting back to the normal filtration mode. In some arrangements, the duration represents an amount of time needed to filter an amount of fluid filtered during the enhanced filtration mode. In a further arrangement, the duration represents an amount of time needed to remove an amount of contaminant from the fluid or to return the fluid to a threshold contamination level as sensed by a sensor. Still further, the duration may represent an amount of time needed for the flow rate of the fluid to stabilize or to return to a normal flow as measured by a flow meter or a flow rate sensor. The duration of the enhanced filtration mode is a relatively short term enhanced filtration response used to reduce contamination levels in the fluid. If a fill-up event was not detected at 608, the ECU 500 proceeds to determine whether a start-up event occurred at 614.

If a signal indicating a start-up event is indicated, the ECU 500 determines a duration of enhanced filtration mode at 610. The duration of enhanced filtration mode represents the time period for which the filtration system is in the enhanced filtration mode before reverting back to the normal filtration mode. In some arrangements, the duration represents an amount of time needed to filter an amount of fluid filtered during the enhanced filtration mode. In a further arrangement, the duration represents an amount of time needed to remove an amount of contaminant from the fluid or to return the fluid to a threshold contamination level as sensed by a sensor. Still further, the duration may represent an amount of time needed for the flow rate of the fluid through the filtration system to stabilize or to return to a normal flow as measured by a flow meter or a flow rate sensor. In some arrangements, the durations of enhanced filtration mode for a fill-up event and for a start-up event are different. For example, the duration of enhanced filtration mode may be longer for a fill-up event than for a start-up event. The duration of the enhanced filtration mode is a relatively short term enhanced filtration response used to reduce contamination levels in the fluid.

Figure 7:
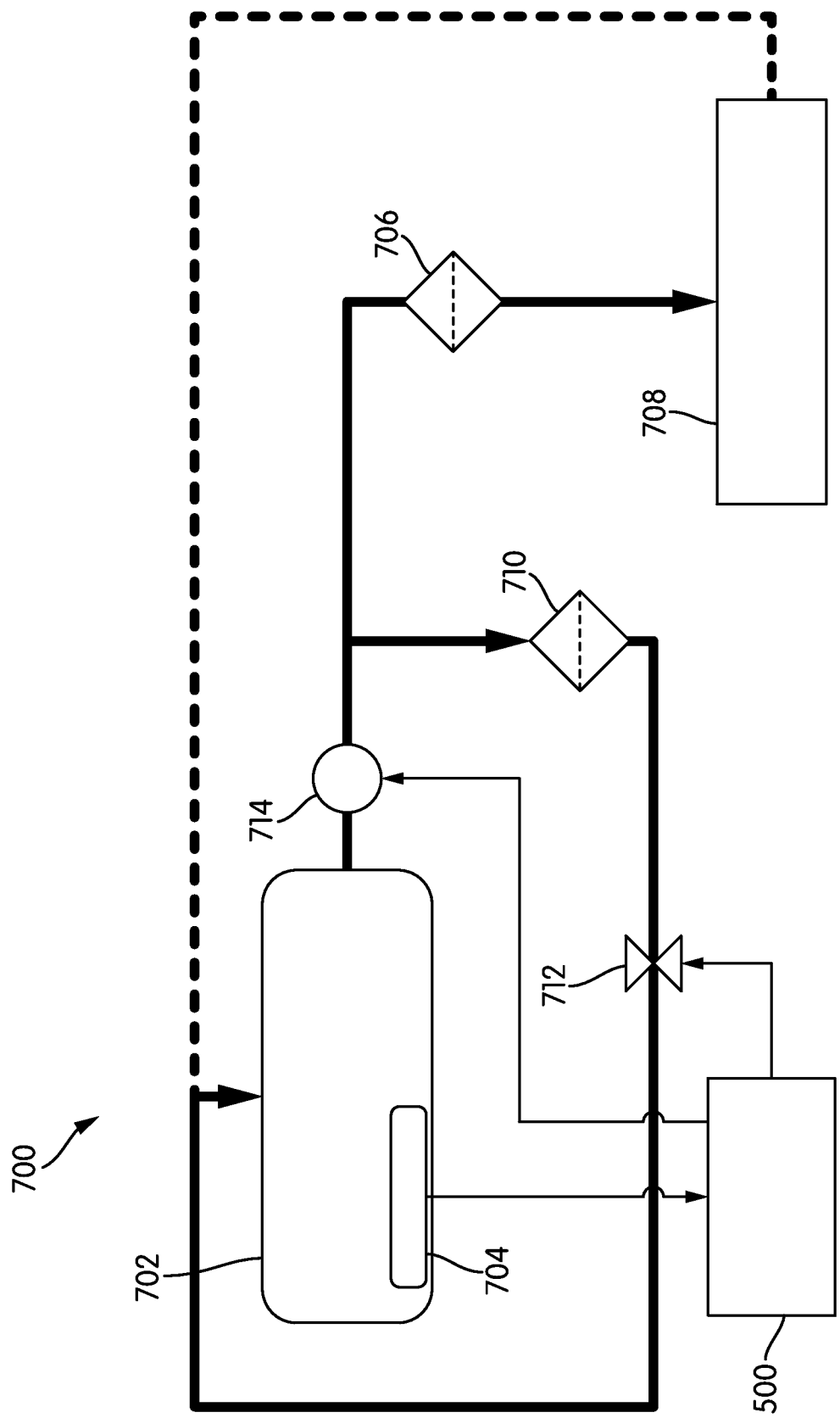
FIGS. 7 through 10 show, schematic views of liquid filtration systems are shown according to example embodiments
Figure 8:
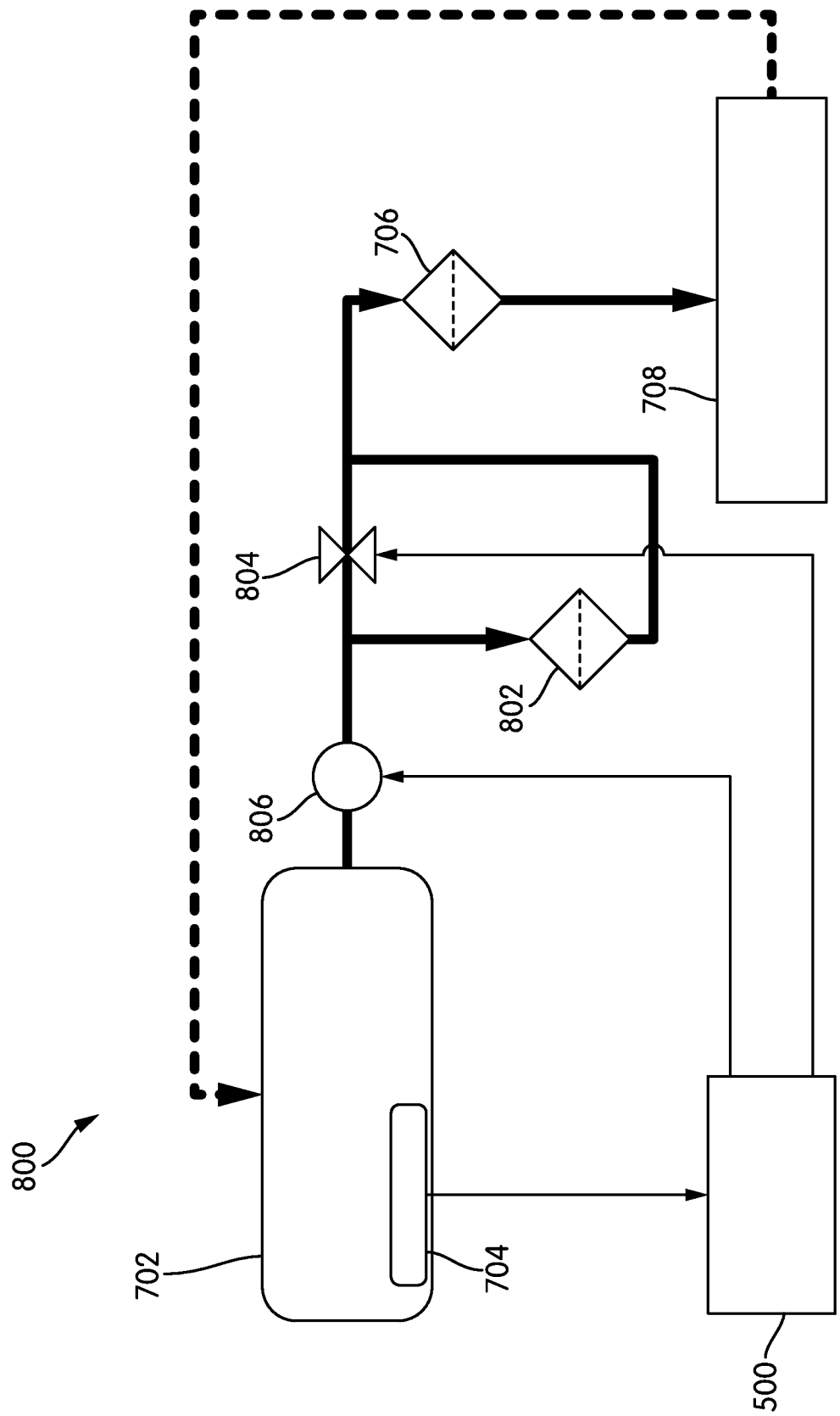
Figure 9:
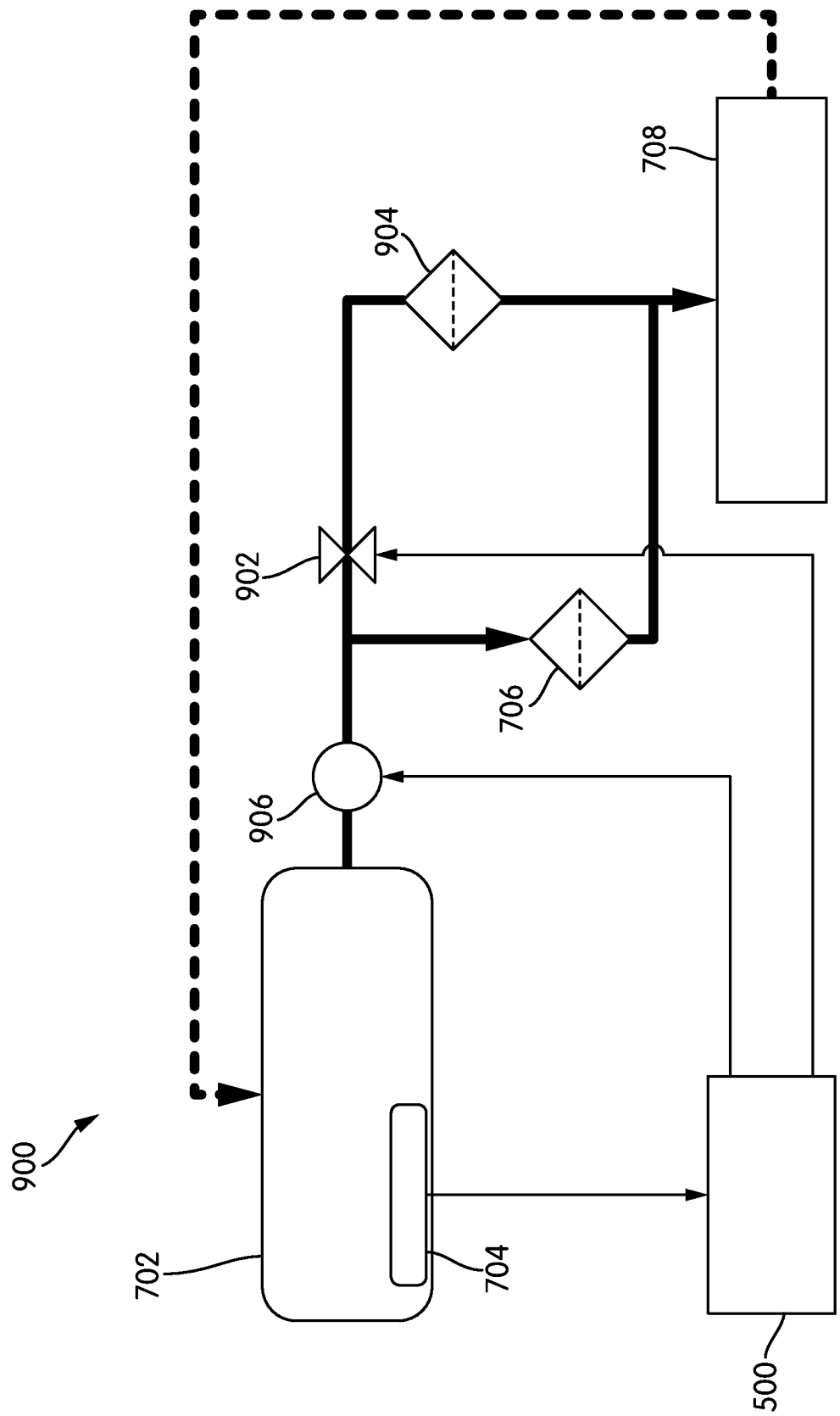
Figure 10:
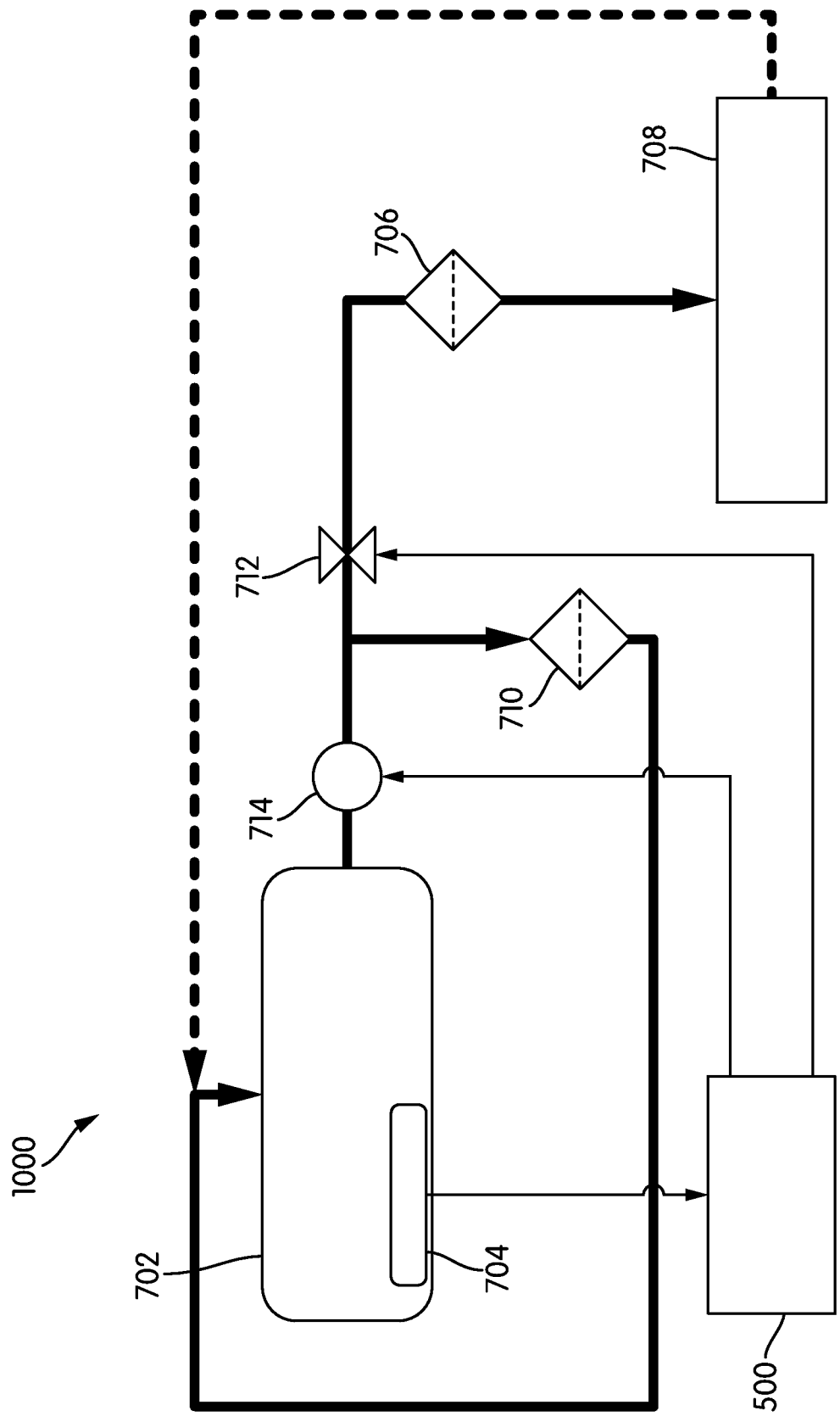

In either case, if a fill-up event is detected at 608 or if a start-up event is detected at 614, the enhanced filtration mode is activated at 612 for the amount of time determined at 610. As described in further detail below with respect to FIGS. 7-10, the enhanced filtration mode can be achieved in different manners. For example, the ECU 500 can actuate a valve that increases the flow rate of the fluid through a kidney loop portion of the filtration system (e.g., as shown in FIG. 7). As an additional example, the ECU 500 can activate a diverter that diverts the fluid flow through an additional prefilter upstream of the main filtration system (e.g., as shown in FIG. 8). As an additional example, the ECU 500 can initiate a duplex or multiplex mode of filtration (e.g., as shown in FIG. 9). As a further example, the ECU 500 can open and close valves to stop fluid flow through the main filtration system and increase flow through a kidney loop filtration system (e.g., as shown in FIG. 10). In some arrangements, a combination of the above enhanced filtration mode techniques is implemented by the ECU 500 for a defined duration to reduce contamination levels in the fluid to acceptable levels.

If no fill-up event is detected at 608 and no start-up event is detected at 614, the filtration system is set to the normal filtration mode at 616. Likewise, if a fill-up event is detected at 608 or if a start-up event is detected at 614, the filtration system is set to the normal filtration mode at 616 after the determined duration (determined at 610) expires during 612. The ECU 500 continues to monitor the sensor feedback signals during operation after the filtration system is placed in the normal filtration mode at 616.

Referring to FIGS. 7 through 10, schematic views of liquid filtration systems are shown according to example embodiments. Each of the described filtration systems includes the ECU 500, a liquid tank 702, a fill-up and/or start-up detector 704, a main filter 706, and an engine or hydraulic system 708. In some arrangements, the main filter 706 includes a plurality of filters. In each of FIGS. 7 through 10, thick lines indicate plumbing connecting the tank 702 to the various components of the filtration systems, such as the main filter 706 and the engine or hydraulic system 708. Plumbing from the engine or hydraulic system 708 back to the tank 702 is indicated as dashed lines, which represents that this section of plumbing exists only in arrangements where the fluid is recirculated. For example, lubrication and hydraulic fluid is typically recirculated, while fuel is generally burned by an internal combustion engine. Although some fuel filtration systems route a portion of the filtered fuel back to the tank 702. Still referring generally to FIGS. 7 through 10, thin lines connect the ECU 500 with the detector 704 and other components (e.g., an actuated valve or a pump). The thin lines represent operational electronic (e.g., hard wire or wireless) connections between these components.

The fluid tank 702 is fitted with one or more detectors 704, such as any of the above-described detectors. The detectors 704 may be located in any appropriate location. In the figures, one detector 704 is shown in the bottom of the tank for illustrative purposes only. It should be understood that detectors may be placed outside of the tank 702 (e.g., at the tank filling cap, at the engine or hydraulic system 708, along any of the fluid lines, etc.). Each of the detectors 704 is operatively connected to the ECU 500 as indicated by the black arrow. When the ECU 500 receives a feedback signal or output indicative of a fill-up event, a start-up event, a fluid flow change, a fluid quality characteristic, or the like, the ECU 500 can send a signal to an actuated valve or pump to activate an enhanced filtration mode (e.g., as described above with respect to method 600) by opening or closing a valve or by controlling pump speed. Typically, the ECU 500 controls the duration of the enhanced filtration mode. The duration may be based on an amount of time (e.g., as calculated by a timer of the ECU 500, a change in flow rate of the fluid (e.g., as determined based on a fluid flow sensor feedback signal), a quality of characteristic of the fluid (e.g., as determined by a fluid quality characteristic sensor), or a combination thereof. The characteristics of the filters are not described in this invention, although it is understood that the main filter 706 is designed to reduce contamination to acceptable levels with acceptable service life and restriction for the application, and other filters are intended to provide performance characteristics adequate to temporarily reduce the excessively high contaminant concentrations found after fill-up and start-up events.

Referring specifically to FIG. 7, a schematic view of a filtration system 700 is shown. The filtration system 700 effectuates the enhanced filtration mode by increasing the flow rate of the fluid through a kidney loop filter 710. The kidney loop filter 710 is part of a fluid recirculating loop (i.e., a kidney loop portion) of the filtration system 700. During normal operation of the filtration system, fluid flows continuously through the both the kidney loop and main filtration lines when the engine or hydraulic system 708 is running In some arrangements, however, it may be desirable for there to be no flow in the kidney loop portion during normal operation. At start-up and immediately upon filling the tank 702, the flow rate through the kidney loop portion, including the kidney loop filter 710, is increased to rapidly decrease contaminant levels in the fluid. The magnitude and duration of the increased flow rate through the kidney loop filter 710 is governed by application considerations, including but not limited to the volume of the tank 702, contamination sensitivity of the downstream components, and the residence time of fluid in the tank 702 during the enhanced filtration mode of operation.

To switch between the enhanced filtration mode and the normal filtration mode, the ECU 500 controls an actuated valve 712. The actuated valve 712 may be located upstream or downstream of the kidney loop filter 710. When the ECU 500 receives a signal or output indicative of a fill-up or start-up event from the detector 704, the ECU 500 sends a signal to an actuated valve 712 that is operatively connected to the ECU 500. The signal causes the actuated valve 712 to open (or to open further) thereby reducing the restriction in the kidney loop portion of the filtration system 700 and enabling increased flow to pass through the kidney loop filter 710. The location where the kidney loop portion branches off from the main filtration line may occur at any appropriate point, but is preferably upstream of main filter 706. In some arrangements, a pump 714 is used to further induce fluid flow through the kidney loop portion. In such arrangements, it may not be necessary to use the actuated valve 712 because the ECU 500 can directly control flow rate through the kidney loop portion via the pump 714.

Referring to FIG. 8, a schematic view of a filtration system 800 is shown. The filtration system 800 effectuates the enhanced filtration mode by diverting the fluid flow through an additional prefilter 802 upstream of the main filter 706. During normal filtration mode operation, the actuated valve 804 is open thereby allowing fluid to continuously flow only through the main filter 706 when the engine or hydraulic system 708 is running (i.e., the fluid bypasses the prefilter 802 during normal filtration mode operation). At start-up and immediately upon filling the tank (i.e., during enhanced filtration), the ECU 500 closes the actuated valve 804 thereby forcing fluid flow through the prefilter 802 prior to passage through the main filter 706. By passing the fluid through the prefilter 802 prior to passing the fluid through the main filter 706, the contaminant concentration in the fluid going to the main filter 706 is reduced, which increases the main filter 706 life and the life of downstream components. In an alternative arrangement, a second filter is placed downstream of the main filter 706 instead of having a prefilter placed upstream of the main filter 706. In such an arrangement, the second filter is used only during start-up and fill-up events in a similar manner as described above with respect to the prefilter 802. Similar to the filtration system 700, a pump 806 may be used to increase fluid flow rate through the prefilter 802 and/or through the main filter 706.

Referring to FIG. 9, a schematic view of a filtration system 900 is shown. The filtration system 900 effectuates the enhanced filtration mode by initiating duplex or multiplex filtration. During normal filtration mode operation, an actuated valve 902 remains closed, which forces the fluid to flow only through the main filter 706 when the engine or hydraulic system 708 is running At start-up and immediately upon filling the tank (i.e., during enhanced filtration), the ECU 500 opens the actuated valve 902 thereby allowing fluid flow through both the main filter 706 and at least one auxiliary filter 904. In some arrangements, an additional actuated valve is positioned in fluid communication with the main filter 706 branch. In such arrangements, it is possible to completely divert flow through the auxiliary filter 904 such that no fluid flows through the main filter 706. Although only one auxiliary filter 904 is shown in FIG. 9, it should be understood that a plurality of auxiliary filters may be employed. By diverting at least a portion of the fluid flow through the auxiliary filter 904, the flow rate through the main filter 706 is reduced, which also reduces loading to the main filter 706 and increases the life of the main filter 706. Additionally, by diverting at least a portion of the fluid flow through the auxiliary filter 904, the overall contaminant concentrations in the fluid may be reduced to any downstream components. The filtration system 900 permits an alternating filter approach in which the fluid flow during normal operation could be directed through either the main filter 706 or the auxiliary filter 904. That is one of the main filter 706 and the auxiliary filter 904 could be used as the "main filter" for a first period of time, and the other of the main filter 706 and the auxiliary filter 904 could be used as the "main filter" for a second period of time. This alternating filter approach enables balanced loading of the main filter 706 and the auxiliary filter 904, which advantageously allows the two filters to be serviced at the same time rather than replacing one filter sooner than the other filter. Similar to the filtration systems 700 and 800, a pump 906 may be used to increase fluid flow rate through the main filter 706 and the auxiliary filter 904.

Referring to FIG. 10, a filtration system 1000 is shown. The filtration system 1000 is similar to the filtration system 700. Accordingly, like numbering is used with respect to the filtration systems 1000 and 700. The sole difference between the filtration system 1000 and the filtration system 700 is the position of the actuated valve 712, which is described in further detail below. Similar to the filtration system 700, the filtration system 1000 effectuates the enhanced filtration mode by routing fluid through a kidney loop portion of the filtration system 1000 that includes the kidney loop filter 710. During normal operation of the filtration system 1000, the actuated valve 712 is open permitting fluid flow through the main filter 706 and to the engine or hydraulic system 708. Following fill-up or start-up events detected by the ECU 500 based on feedback from the detector 704, the ECU 500 sends an output to the actuated valve 712 to fully or partially close the actuated valve 712, which temporarily increases the fluid flow through the kidney loop filter 710. Thus, the main filter 706 and any downstream components do not see total contamination load per unit time despite the elevated contaminant concentrations, and the main filter 706 and downstream components are protected from any spikes in contaminant concentration of the liquid thereby increasing their lives, increasing equipment reliability, and increasing system robustness.

As discussed above, the filtration system 1000 can enter the enhanced filtration mode with the actuated valve 712 fully closed or partially open. In arrangements where the actuated valve 712 is fully closed, fluid flow through the main filter 706, and thus to the engine or hydraulic system 708, is cut off. Accordingly, this option is only practical if actual operation of the equipment using the engine or hydraulic system 708 can be delayed until the fluid is cleaned. In other arrangements, the actuated valve 712 remains partially open following fill-up or start-up events to enable a small amount of the fluid to pass through to the main filter 706 and on to the engine or hydraulic system 708 to enable minimal operation of the engine or hydraulic system 708 (e.g., engine idling) to occur during the time that the fluid is being cleaned by the kidney loop filter 710.

Regardless of the particular filtration system used, the enhanced filtration mode is implemented by the ECU 500 immediately after detection of a fill-up event, a start-up event, another transient event (e.g., events that cause changes in fluid flow rate through the filtration system), and upon start-up or initiation of fluid flow from the tank 702. The enhanced filtration mode is continued temporarily until one or more of the following conditions occurs (1) until a predetermined time has elapsed, (2) until a predetermined volume of fluid has been filtered, (3) until contamination levels in the fluid have dropped to acceptable levels as determined by an actual or virtual contamination sensor, (4) until the flow rate of fluid through he filtration system has stabilized for a defined period of time, or (5) when the flow rate of fluid through the filtration system has returned to a normal flow rate. Once one or more of the above-noted conditions is achieved, the ECU 500 sends an appropriate output signal to return the system to its normal or typical operating mode or condition. In arrangements where the enhanced filtration mode stops after a predetermined time has elapsed, the predetermined time may be calculated as a function of the residence time of the fluid during operation in the enhanced filtration mode. Normally, the predetermined time should be at least three times the residence time. In arrangements where the enhanced filtration mode stops after a predetermined volume of fluid has been filtered, the predetermined volume is typically a function of the tank 702 volume. Normally, the predetermined volume to be filtered during the enhanced filtration mode should be at least three times the tank volume. In arrangements where the enhanced filtration mode stops after contamination levels of the fluid have been reduced to an acceptable level, a contamination sensor, such as a portable particle counter or other type of contamination sensor, can be fluidly connected to the system (e.g., immediately downstream of the tank 702) and electronically connected to the ECU 500 to provide an output signal indicative of the contaminant concentration. When the contamination reaches an acceptable level of cleanliness, such as an ISO 4406 code of 18/16/13 in fuel as measured using a portable particle sensor, the ECU 500 then outputs a signal to discontinue enhanced filtration mode.

As previously mentioned, in some arrangements it is desirable to distinguish between fill-up and start-up events, as contamination levels are likely to be higher after fill-up events. In response to determining different events, different enhanced filtration modes can be implemented by the ECU 500 depending on the type of event. For example, one (or more) of the enhanced filtering modes can be used in response to start-up events for a first time period or volume of fluid filtered, and the same enhanced filtering modes can be used in response to fill-up events for a longer period of time or a greater volume of fluid filtered. For example, if a period of time of three minutes is used for start-up events, a period of time of six minutes or longer can be used for fill-up events. The above-described enhanced filtration modes can also be applied in response to other detected events, such as events that cause fluid flow surges (e.g., as occur when depressing the accelerator). For example, the enhanced filtration mode can be used in response to rapidly changing fluid flow rates and continue for a period of time (e.g., three minutes) after the flow rate stabilizes. In such arrangements, the enhanced filtering mode may be implemented for a different time period or volume of fluid filtered than for fill-up or start-up events.

The above-described filtration systems 700, 800, 900, and 1000 are described with respect to providing fluid to an engine or hydraulic system 708. However, it should be appreciated that the enhanced filtration modes described in the filtration systems 700, 800, 900, and 1000 can also be applied to bulk storage tanks for fluid or other applications not directly attached to an engine or hydraulic system. For example, by removing eliminating the engine or hydraulic system 708 in any of the in any of the filtration systems 700, 800, 900, or 1000, the resultant system can be used with bulk storage or dispensing tanks in which the fluid from the main filter 706 is recirculated and/or dispensed.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" or "example" as used herein to describe various embodiments is intended to indicate that such embodiments are possible examples, representations, and/or illustrations of possible embodiments (and such term is not intended to connote that such embodiments are necessarily extraordinary or superlative examples).

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filtration system comprising:
   a fluid source providing a fluid to be filtered to a filtration line;
   a main filter;
   a secondary filter positioned upstream of the main filter in a fluid flow direction;
   a detector that detects a fill-up condition, a start-up condition, a change in fluid contaminant concentration, or a fluid flow rate change of a second system using the fluid;
   a valve positioned upstream of the main filter and downstream of the secondary filter in the fluid flow direction, the valve can be opened or closed so as to switch the filtration system between a normal filtration mode and an enhanced filtration mode, the normal filtration mode corresponding to a first operating mode where fluid to be filtered flows to the main filter through a first flow path from the filtration line to a location downstream the main filter,
   the enhanced filtration mode corresponding to a second operating mode in which an increased amount of the fluid to be filtered is filtered through the secondary filter element than when in the normal filtration mode, the fluid to be filtered flows along a second flow path from the filtration line through the secondary filter prior to flowing to the main filter element,
   an electronic control unit having a memory and a processor, the electronic control unit configured to:
      receive a feedback signal from the detector indicative of the fill-up event the start-up event, the change in fluid contaminant concentration, or the fluid flow rate change of the second system, and
      switch between the normal filtration mode and the enhanced filtration mode in response to the fill-up event, the start-up event, the change in fluid contaminant concentration, or the fluid flow rate change.

2. The filtration system of claim 1, wherein when the filtration system is in the normal filtration mode, no fluid to be filtered flows through the secondary filter.

3. The filtration system of claim 1, wherein when the filtration system is in the normal filtration mode, some fluid to be filtered flows through the secondary filter.

4. The filtration system of claim 1, wherein the system using the fluid is an internal combustion engine.

5. The filtration system of claim 1, wherein the system using the fluid is a hydraulic system.

6. The filtration system of claim 1, further comprising a pump that further induces fluid flow through the secondary filter.

7. A filtration system comprising:
   a fluid tank fluid source providing a fluid to be filtered;
   a main filter;
   a secondary filter;
   a detector that detects a fill-up condition, a start-up condition, a change in fluid contaminant concentration, or a fluid flow rate change of a second system using the fluid;
   a valve that can be opened or closed so as to switch the filtration system between a normal filtration mode and an enhanced filtration mode, the enhanced filtration mode corresponding to an operating mode in which an increased amount of the fluid to be filtered is filtered through the secondary filter element than when in the normal filtration mode;
   an electronic control unit having a memory and a processor, the electronic control unit configured to:
      receive a feedback signal from the detector indicative of the fill-up event, the start-up event, the change in fluid contaminant concentration, or the fluid flow rate change of the second system, and
      switch between the normal filtration mode and the enhanced filtration mode in response to the fill-up event, the start-up event, the change in fluid contaminant concentration, or the fluid flow rate change,
   wherein the fluid source is a fluid tank, and wherein the secondary filter is part of a fluid recirculating loop that routes fluid that passes through the secondary filter back to the fluid tank.

8. The filtration system of claim 7, wherein the detector further detects at least one of whether a fluid tank cap of the fluid tank is in place or has been removed, changes of a fluid level in the fluid tank, changes in a fluid flow rate of the fluid of the second system, contaminant concentration in the fluid of the second system, or whether the second system using the fluid has been turned on.

9. A filtration system comprising:
   a fluid source providing a fluid to be filtered to a filtration line;
   a main filter;
   a secondary filter positioned upstream of the main filter in a fluid flow direction;
   a fluid quality characteristic sensor that senses a fluid quality characteristic of the fluid;
   a valve positioned upstream of the main filter and downstream of the secondary filter in the fluid flow direction, the valve can be opened or closed so as to switch the filtration system between a normal filtration mode and an enhanced filtration mode, the normal filtration mode corresponding to a first operating mode where fluid to be filtered flows to the main filter through a first flow path from the filtration line to a location downstream the main filter,
   the enhanced filtration mode corresponding to a second operating mode in which an increased amount of the fluid to be filtered is filtered through the secondary filter element than when in the normal filtration mode, the fluid to be filtered flows along a second flow path from the filtration line through the secondary filter prior to flowing to the location downstream the main filter,
   an electronic control unit having a memory and a processor, the electronic control unit configured to:
      receive a feedback signal from the detector indicative of a change in the fluid quality characteristic of the fluid, and
      switch between the normal filtration mode and the enhanced filtration mode in response to the change in the fluid quality characteristic.

10. The filtration system of claim 9, wherein when the filtration system is in the normal filtration mode, no fluid to be filtered flows through the secondary filter.

11. The filtration system of claim 9, wherein when the filtration system is in the normal filtration mode, some fluid to be filtered flows through the secondary filter.

12. The filtration system of claim 9, wherein the fluid quality characteristic of the fluid is the fluid being used by a second system, the second system being an internal combustion engine.

13. The filtration system of claim 9 wherein the fluid quality characteristic of the fluid is the fluid being used by a second system, the second system being a hydraulic system.

14. The filtration system of claim 9, wherein the fluid quality characteristic is an amount of contaminant in the fluid.

15. A filtration system comprising:
a fluid source providing a fluid to be filtered;
a main filter;
a secondary filter;
a fluid quality characteristic sensor that senses a fluid quality characteristic of the fluid;
a valve that can be opened or closed so as to switch the filtration system between a normal filtration mode and an enhanced filtration mode, the enhanced filtration mode corresponding to an operating mode in which an increased amount of the fluid to be filtered is filtered through the secondary filter element than when in the normal filtration mode;
an electronic control unit having a memory and a processor, the electronic control unit configured to:
 receive a feedback signal from the detector indicative of a change in the fluid quality characteristic of the fluid, and
 switch between the normal filtration mode and the enhanced filtration mode in response to the change in the fluid quality characteristic,
wherein the fluid source is a fluid tank, and wherein the secondary filter is part of a fluid recirculating loop that routes fluid that passes through the secondary filter back to the fluid tank.

16. A filtration system comprising:
a fluid source providing a fluid to be filtered;
a main filter;
a secondary filter positioned upstream of the main filter in a fluid flow direction;
a detector that detects a fill-up condition, a start-up condition, a change in fluid contaminant concentration, or a fluid flow rate change of a second system using the fluid;
a pump positioned upstream of the main filter and downstream of the secondary filter in the fluid flow direction, the pump routes the fluid to the secondary filter such that the pump can be activated and deactivated to switch the filtration system between a normal filtration mode and an enhanced filtration mode, the normal filtration mode corresponding to a first operating mode where fluid to be filtered flows to the main filter through a first flow path,
the enhanced filtration mode corresponding to a second operating mode in which an increased amount of the fluid to be filtered is filtered through the secondary filter than when in the normal filtration mode, the fluid to be filtered flows along a second flow path through the secondary filter prior to flowing to the main filter element;
an electronic control unit having a memory and a processor, the electronic control unit configured to:
 receive a feedback signal from the detector indicative of the fill-up event, the start-up event, the change in fluid contaminant concentration, or the fluid flow rate change of the second system, and,
 switch between the normal filtration mode and the enhanced filtration mode in response to the fill-up event, the start-up event, the change in fluid contaminant concentration, or the fluid flow rate change by activating the pump.

17. The filtration system of claim 16, wherein when the filtration system is in the normal filtration mode, no fluid to be filtered flows through the secondary filter.

18. The filtration system of claim 16, wherein when the filtration system is in the normal filtration mode, some fluid to be filtered flows through the secondary filter.

19. The filtration system of claim 16, wherein the system using the fluid is an internal combustion engine.

20. The filtration system of claim 16, wherein the system using the fluid is a hydraulic system.

21. A filtration system comprising:
a fluid source providing a fluid to be filtered;
a main filter;
a secondary filter;
a detector that detects a fill-up condition, a start-up condition, a change in fluid contaminant concentration, or a fluid flow rate change of a second system using the fluid;
a pump that routes the fluid to the secondary filter such that the pump can be activated and deactivated to switch the filtration system between a normal filtration mode and an enhanced filtration mode,
the enhanced filtration mode corresponding to an operating mode in which an increased amount of the fluid to be filtered is filtered through the secondary filter than when in the normal filtration mode;
an electronic control unit having a memory and a processor, the electronic control unit configured to:
 receive a feedback signal from the detector indicative of the fill-up event, the start-up event, the change in fluid contaminant concentration, or the fluid flow rate change of the second system, and,
 switch between the normal filtration mode and the enhanced filtration mode in response to the fill-up event, the start-up event, the change in fluid contaminant concentration, or the fluid flow rate change by activating the pump,
wherein the fluid source is a fluid tank, and wherein the secondary filter is part of a fluid recirculating loop that routes fluid that passes through the secondary filter back to the fluid tank.

22. The filtration system of claim 21, wherein the detector further detects at least one of whether a fluid tank cap of the fluid tank is in place or has been removed, changes of a fluid level in the fluid tank, changes in a fluid flow rate of the fluid of the second system, contaminant concentration in the fluid of the second system, or whether the second system using the fluid has been turned on.

* * * * *